US008582305B1

(12) United States Patent
Quaife et al.

(10) Patent No.: US 8,582,305 B1
(45) Date of Patent: Nov. 12, 2013

(54) POWER CABLE CONNECTION AND DISCONNECTION USING A POWER ATTACHMENT ASSEMBLY (PAA)

(75) Inventors: Philip Quaife, Santa Clara, CA (US); Jaspal Gill, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 358 days.

(21) Appl. No.: 13/089,571

(22) Filed: Apr. 19, 2011

(51) Int. Cl.
 *H05K 7/16* (2006.01)
 *H02B 11/12* (2006.01)
 *H01H 9/00* (2006.01)

(52) U.S. Cl.
 USPC ............................ 361/727; 361/609; 200/17 R (58) Field of Classification Search
 USPC .................................. 361/600–678, 724–727
 See application file for complete search history.

(56) References Cited

U.S. PATENT DOCUMENTS

| | | | | |
|---|---|---|---|---|
| 6,018,456 A * | 1/2000 | Young et al. | ............... | 361/679.4 |
| 6,134,115 A * | 10/2000 | Sim et al. | ...................... | 361/747 |
| 6,374,460 B1 * | 4/2002 | Edevold et al. | ................ | 16/422 |
| 6,552,286 B2 * | 4/2003 | Yang et al. | .................... | 200/330 |
| 6,812,416 B2 * | 11/2004 | Tasse | ........................ | 200/50.01 |
| 7,379,305 B2 * | 5/2008 | Briggs et al. | ................. | 361/727 |
| 7,515,428 B2 * | 4/2009 | Tang | ............................. | 361/727 |
| 8,027,134 B2 * | 9/2011 | Ziegler et al. | ............... | 361/93.1 |

* cited by examiner

*Primary Examiner* — Zachary M Pape
(74) *Attorney, Agent, or Firm* — Harrity & Harrity, LLP (57) ABSTRACT

A power connection system includes a power attachment assembly (PAA) to house power cables that transport electrical power, where the cables are terminated by a connector associated with the PAA; and a power supply to provide the power to a network device, where the power supply includes another connector and a group of circuit breakers that correspond to the cables. The PAA and the power supply permit the cables to be connected to the power supply, and permit the connector and the other connector to be connected to form a junction via which the power is transported. The circuit breakers, when turned on, permit the power to be received from the cables via the PAA. The system also includes a handle to disconnect the PAA from the power supply in a manner that turns off the circuit breakers prior to disconnecting the PAA from the power supply.

21 Claims, 11 Drawing Sheets

POWER CABLE CONNECTION AND DISCONNECTION USING A POWER ATTACHMENT ASSEMBLY (PAA)

BACKGROUND

Public and/or proprietary networks usually include one or more central offices, such as switching centers (e.g., common carrier switching centers, etc.) and/or exchanges (e.g., switching exchanges, telephone exchanges, Internet exchanges, etc.). The central offices use network devices (e.g., switches, servers, etc.) to receive, process and/or transmit traffic within the networks and/or to other networks. The network devices usually include a power supply that that receives power from the central office and conditions the power for use by the network devices. The power that is received from the central offices is usually received from central office direct current (DC) batteries (e.g., –48V DC) that ensure that the networks continue to operate during a power outage (e.g., an outage of power received from an alternating current (AC) power grid) or when AC power is otherwise not available.

Unfortunately, DC power may need to be temporarily shut off during a maintenance operation on a network device and/or when removing or replacing power cables attached to the network device. Shutting off the DC power may affect other network devices and/or may cause a temporary service disruption.

SUMMARY

According to one aspect, a power cable connection system may include a power attachment assembly (PAA) to house a group of power cables that transport electrical power from a power source, where the group of power cables may be terminated by a connector associated with the PAA. The system may also include a power supply to provide the electrical power to a network device, where the power supply may include another connector and a group of circuit breakers that corresponds to the group of power cables. The PAA and the power supply may permit the group of power cables to be connected to the power supply without using tools or turning off the electrical power. The PAA and the power supply may permit the connector and the other connector to be connected to form a junction via which the electrical power is transported to the power supply. The group of circuit breakers, when turned on, may permit the electrical power to flow from the junction to the network device via the group of circuit breakers. The systems may further include a handle, attached to the PAA via a hinge, to disconnect the PAA from the power supply, where, the hinge may permit the handle to be moved in a manner that simultaneously turns off the group of circuit breakers prior to disconnecting the PAA from the power supply, and may enable the PAA to be disconnected without using tools or shutting off the electrical power.

According to another aspect, an electrical power junction may include a power attachment assembly (PAA) that includes a harness to attach a group of power cables that carry electrical power from a power source, a connector to terminate the group of power cables, and a movable handle to disconnect the PAA. The junction may also include a power supply, connected to a network device, that includes a port that permits the PAA to be installed in the power supply and a group of circuit breakers that correspond to the group of power cables. The PAA and the power supply may permit the group of power cables to be connected to the power supply when the PAA is installed in the power supply. The PAA and the power supply may permit the connector and another connector, associated with the port, to form a connection via which the electrical power is transported, when the PAA is installed in the port. The group of circuit breakers may control whether the electrical power is transported to the power supply, via the connection, when the PAA is installed in the port. The movable handle may turn off the group of circuit breakers when moved to a particular position, and the movable handle may permit the PAA to be de-installed from the port without shutting off the electrical power or using tools to disconnect the group of power cables from the power supply.

According to yet another aspect, a power supply assembly may include a power cable chassis to hold a group of power cables that carry electrical power from a power source, where the power cable chassis may include a harness via which the group of power cables are held, a connector that terminates each of the group of power cables, and a handle on which a force can be applied to install or de-install the power cable chassis. The assembly may also include a power supply chassis via which the electrical power is sent to a network device, where the power supply chassis may include a port to house the power cable chassis when installed in the power supply chassis, and another connector that interconnects to the connector when the power cable chassis is installed in the power supply chassis. The power supply chassis may also include a group of circuit breakers that permit the electrical power to flow to the network device when the power cable chassis is installed in the power supply chassis and at least one of the group of circuit breakers is turned on, and may preclude the electrical power from flowing to the network device when the power cable chassis is installed in the power supply chassis and the handle is moved to a de-install position that turns off a group of switches associated with the group of circuit breakers.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods described herein may enable electrical power to be connected to and/or disconnected from a power supply, associated with a network device, in a manner that does not include shutting off power from a power source. The term power, as described herein, may refer to electrical power that is received from a direct current (DC) power source, such as from a battery and/or bank of batteries (e.g., −48V DC batteries provided at a central office).

As described herein, a power attachment assembly (PAA) may be used to connect the power to a power supply associated with a network device without shutting off the DC power source. The PAA may enable one or more power cables (e.g., that are attached to the DC power source) to be fixed within a harness associated with the PAA and/or connected to a connector associated with the PAA. The PAA may be mechanically connected to the power supply via a port associated with the power supply. The PAA may be electrically connected to the power supply when the connector, associated with the PAA, is joined with another connector associated with the power supply (e.g., within the port of the power supply) to form an electrical junction between the PAA and the power supply. When the PAA is mechanically and electrically coupled to the power supply, one or more circuit breakers, associated with the power supply, may be turned on to permit the power to be sent to the power supply. Connecting the PAA to the power supply may enable the power to be sent to the power supply without shutting off the DC power source and/or without using tools (e.g., via an attachment using studs and lugs) to connect the power cables to the power supply.

As also described herein, the PAA may be used to disconnect the power to the power supply without shutting off the DC power source. To initiate an operation to disconnect the power from the power supply, the one or more circuit breakers, associated with the power supply, may be shut off. The PAA may be mechanically disconnected from the power supply by removing the PAA from the port associated with the power supply. The PAA may be electrically disconnected from the power supply when the connector, associated with the PAA, is disconnected from the other connector as a result of the mechanical disconnection. Disconnecting the PAA from the power supply may enable the power to be disconnected from the power supply without shutting off the DC power source and/or without using tools to disconnect the power cables from the power supply (e.g., by detaching the lugs from the studs).

In an example implementation, the PAA may be coupled to and/or decoupled from the power supply using a handle associated with the PAA (hereinafter referred to as a "PAA handle"). The PAA handle may be used to insert the PAA into the port and/or to establish the electrical junction between the PAA and the power supply. When the decoupling the PAA from the power supply, the PAA handle may be used to automatically shut off the one or more circuit breakers, to mechanically decouple the PAA from the power supply, and/or to electrically decouple the PAA from the power supply.

Using the PAA and/or the PAA handle to connect and/or disconnect the power cables to the power supply may reduce a quantity of mis-wiring incidences and/or a likelihood of damage to the power supply caused by mis-wiring incidences. Additionally, using the PAA and/or the PAA handle to connect and/or disconnect the power cables may reduce a period of time associated with connecting or disconnecting power cables. Furthermore, using the PAA and/or the PAA handle to connect and/or disconnect the power cables may reduce a likelihood of injury to an operator associated with using tools to individually connect or disconnect the power cables from the power supply.

Figure 1A:
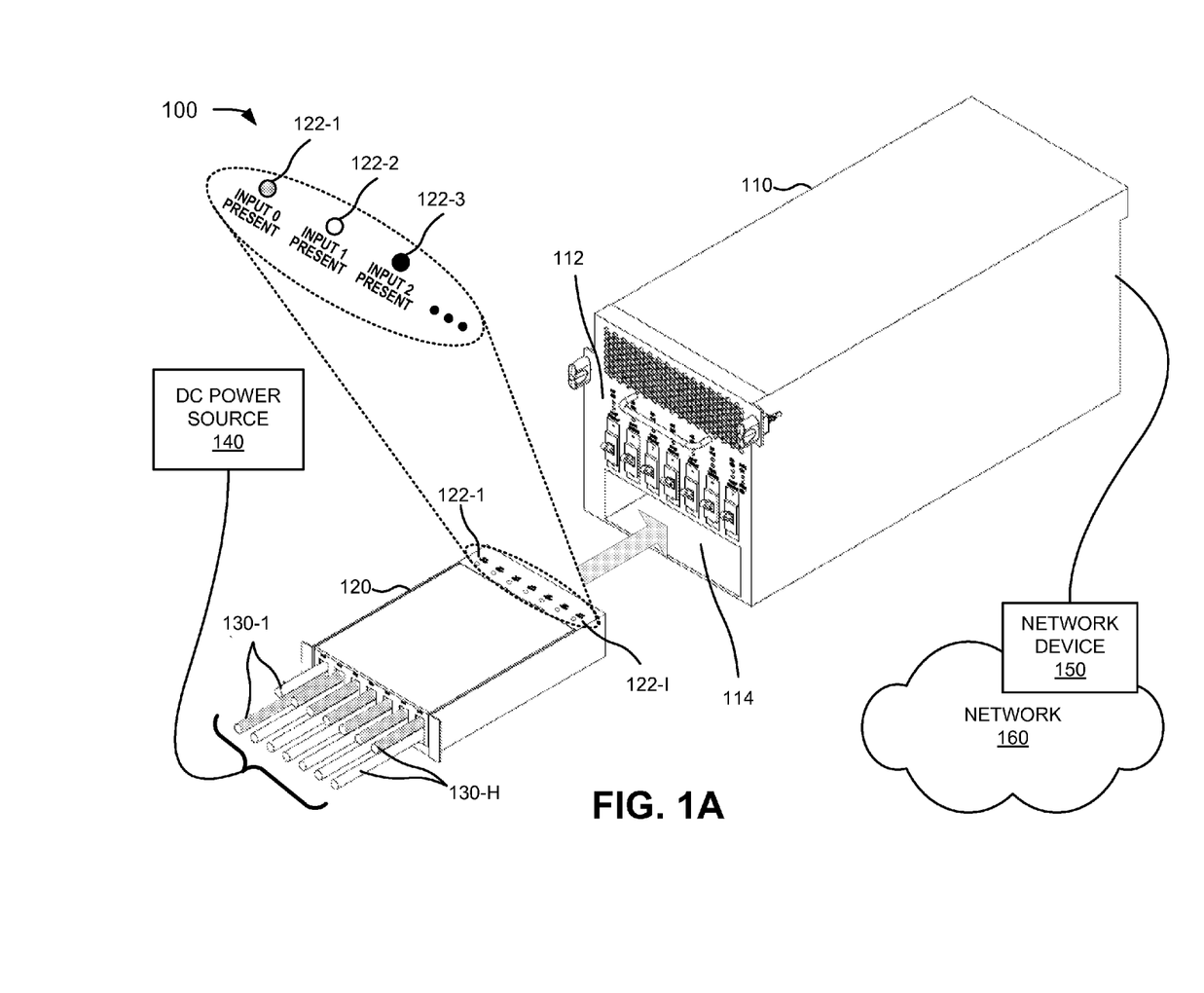
FIGS. 1A and 1B are diagrams of an overview of a power supply network according to an implementation described herein.
Figure 1B:
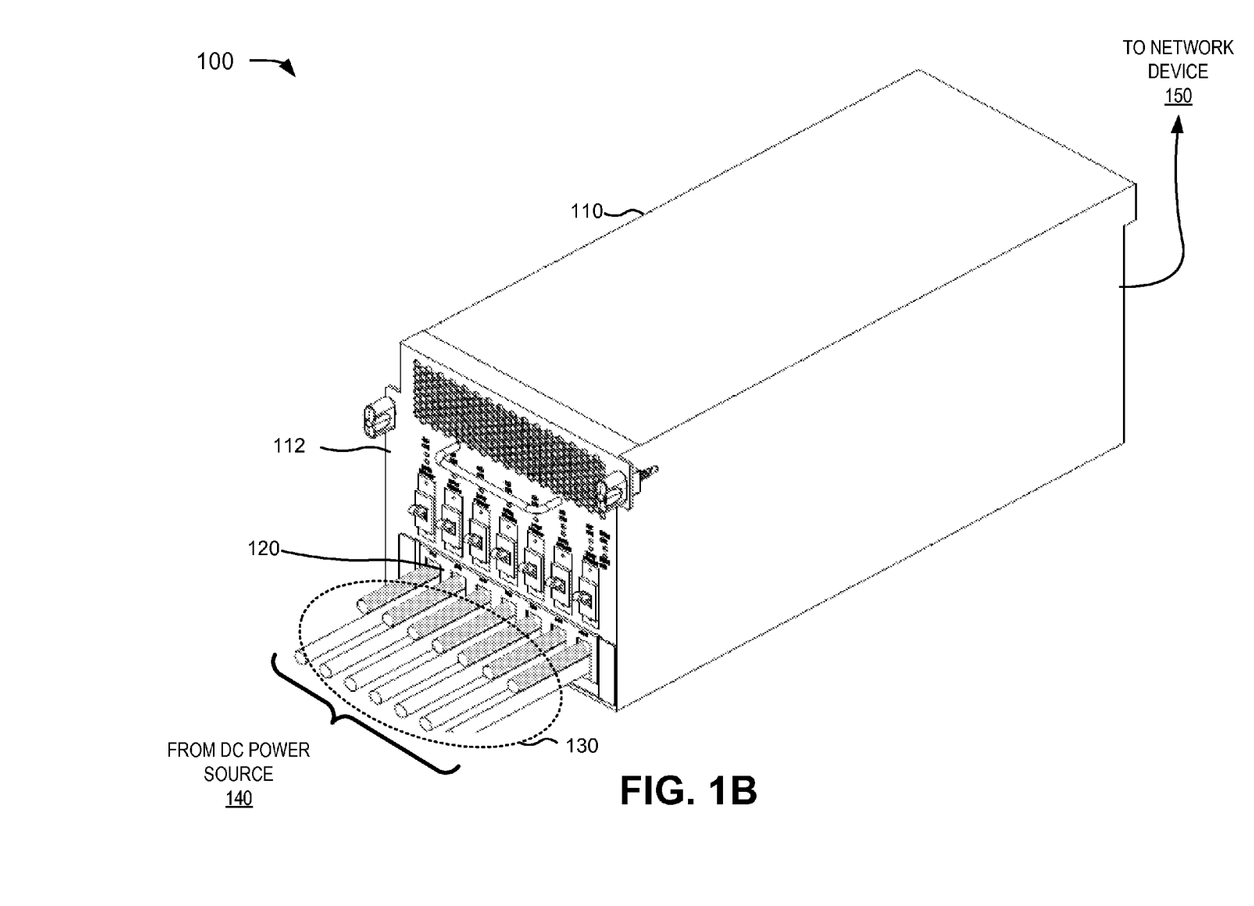

FIGS. 1A and 1B are diagrams of an overview of a power supply network 100 according to an implementation described herein. As shown in FIG. 1A, power supply network 100 may include a power supply 110, a power attachment assembly (PAA) 120, a group of power cable pairs 130-1, . . . , 130-H (where H≥1) (hereinafter referred to collectively as "power cables 130" and individually as "power cable 130"), a direct current (DC) power source 140, a network device 150, and a network 160. The number of devices and/or networks, illustrated in FIGS. 1A and 1B is provided for explanatory purposes only. In practice, there may be additional devices and/or networks; fewer devices and/or networks; different devices and/or networks; or differently arranged devices and/or networks than illustrated in FIGS. 1A and 1B.

Also, in some implementations, one or more of the devices of power supply network 100 may perform one or more functions described as being performed by another one or more of the devices of power supply network 100. For example, power supply 110 and network device 150 may be combined into a single device.

Power supply 110 may include one or more devices capable of receiving power from DC power source 140 via PAA 120 and/or power cables 130 and/or providing conditioned power to network device 150. In one example implementation, power supply 110 may condition the received power in a manner that enables network device 150 to receive power and/or perform network operations. Power supply 110 may condition the power by converting electrical parameters associated with the received power (e.g., current, voltage, power level, etc.) to levels that conform to input parameters associated with network device 150. Power supply 110 may include a control panel 112 and a PAA port 114.

Control panel 112 may enable an operator to determine a state (e.g., power status, circuit breaker status, fault status, etc.) associated with power supply 110 and/or to control power supply 110. PAA port 114 may enable PAA 120 to be installed within power supply 110 so that power supply 110 can receive power from DC power source 140 via PAA 120 and/or power cables 130.

PAA 120 may include one or more devices that are capable of receiving power from DC power source 140 via power cables 130. PAA 120 may, in one example, be a chassis in which power cables 130 are installed to enable DC power source 140 to be connected to and/or disconnected from power supply 110. PAA 120 may, for example, enable power to be connected to power supply 110, via power cables 130, without causing power, from DC power source 140, to be shut off. PAA 120 may enable the power to be connected in a manner that does not include using tools to establish the connection. PAA 120 may, in another example, enable power to be disconnected from power supply 110 without causing power from DC power source 140 to be shut off. PAA 120 may enable the power to be disconnected in a manner that does not include using tools to disconnect power cables 130. Generally, inserting PAA 120 into a port (e.g., port 114) associated with power supply 110, may connect power cables 130 to power supply 110, which may cause power to be transmitted to power supply 110. Additionally, or alternatively, removing PAA from the port may, generally, disconnect power cables 130 from power supply 110, which may preclude power from being transmitted to power supply 110.

PAA 120 may include a group of status indicators 122-1, . . . , 122-I (where I≥1) (hereinafter referred to collectively as "status indicators 122" and individually as "status indicator 122"). Status indicators 122 may include one or more devices, such as light emitting diodes (LEDs), lights, speakers, displays, etc., that provide an indication, to an operator of power supply 110 and/or PAA 120, regarding whether power is being received from power cables 130. Each status indictor 122 may be associated with a pair of power cables 130 (e.g., a ground cable and another cable with a positive or negative voltage relative to a ground voltage).

In an example implementation, status indicator 122-2 may be a LED that emits light of a particular color (e.g., green) when power is being received via a power cable pair (e.g., power cable 130-2) to which status indicator 122-2 corresponds. In another example, status indicator 122-3 may be an LED that does not emit any light when power is not being received from another power cable pair (e.g., power cable 130-3) to which status indicator 122-3 corresponds. In yet another example, status indicator 122-1 may be an LED that emits light of a different color (e.g., red) when a further power cable pair (e.g., power cable 130-1), to which status indicator 122-1 corresponds, has been mis-wired (e.g., a polarity, associated with power cable 130-1, has been reversed).

Power cables 130 may include one or more pairs of power cables that transport power from DC power source 140 to PAA 120. The one or more pairs of power cables may include conductive wires that are sized (e.g., associated with a wire gauge) based on a quantity of voltage, current, power, etc. that is being transmitted from DC power source 140 to PAA 120. Each of power cables 130 may include a power cable that is connected to a ground voltage (e.g., a ground cable) and another power cable that is connected to a positive or negative voltage relative to the ground voltage (e.g., a hot cable). Power cables 130 may be connected to PAA 120 via a wire harness, associated with PAA 120, that maintains power cables 130 in a fixed position, relative to PAA 120, when power cables connect to or disconnect from power supply 110.

DC power source 140 may include one or more devices that generate and/or store power to be transmitted to PAA 120 via power cables 130. In one example implementation, DC power source 140 may be a rectifier that converts alternating current (AC)-based power to DC power. In another example implementation, DC source power 140 may be storage device (e.g., a battery, a bank of batteries, an uninterruptable power supply, etc.) that provides power to PAA 120 via power cables 130.

Network device 150 may include one or more devices, or other types of computation or communication devices, that gather, process, search, store, and/or provide information in a manner similar to that described herein. Network device 150 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, network device 150 may be configured to receive power from DC power source 140 via PAA 120. In another example implementation, network device 150 may receive, process, and/or may transmit traffic associated with network 160.

Network 160 may include one or more wired and/or wireless networks. For example, network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, network 160 may include a wide area network (WAN), a metropolitan area network (MAN), a telephone network (e.g., a Public Switched Telephone Network (PSTN)), an ad hoc network, an intranet, the Internet, a fiber optic-based network, and/or a combination of these or other types of networks.

As shown in FIG. 1B, PAA 120 may be installed in power supply 110. For example, PAA 120 may be inserted into port 114 (FIG. 1A). PAA 120 may be inserted into port 114 in a manner that causes power cables 130 to be connected to power supply 110 without using tools to individually connect each of power cables 130 to power supply 110. Additionally, using PAA 120 to connect power cables 130 may reduce a likelihood of mis-wiring one or more of power cables 130, which may cause damage to power supply 110 and/or network device 150, and/or may reduce a risk of injury to an operator of power supply 110 and/or PAA 120.

PAA 120 may be removed from port 114 which may disconnect power cables 130 from power supply 110 without using tools to individually disconnect each of power cables 130 from power supply 110. Additionally, using PAA 120 to disconnected power cables 130 may reduce a risk of injury to an operator of power supply 110 and/or PAA 120.

Figure 2:
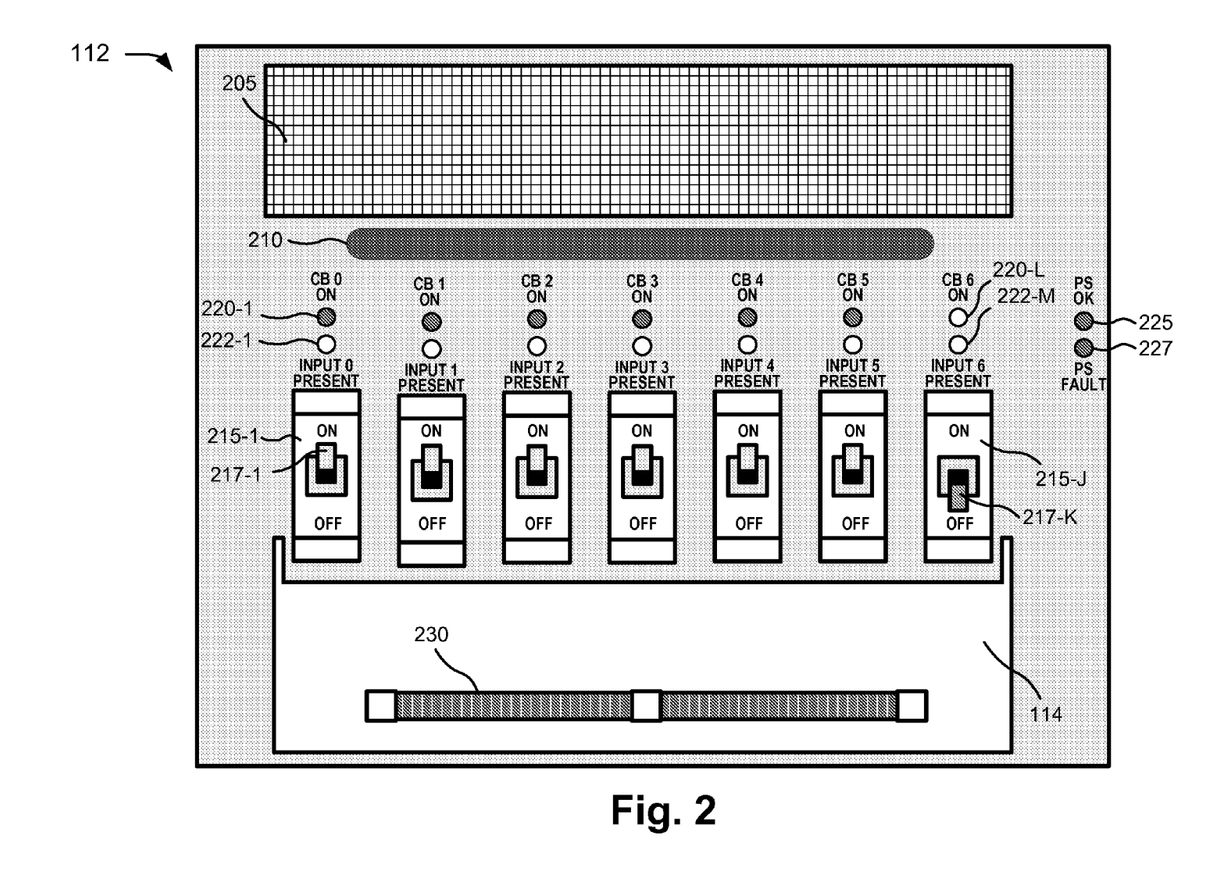
FIG. 2 is a diagram of an example power supply control panel.

FIG. 2 is a diagram of an example power supply control panel 112 (hereinafter referred to as "control panel 112") according to an implementation described herein. Control panel 112 may include a collection of components, such as a vent 205, a handle 210, a group of circuit breakers (CBs) 215-1, . . . , 215-J (where J≥1) (hereafter referred to collectively as "CBs 215" and individually as "CB 215"), a group of circuit breaker (CB) switches 217-1, . . . , 217-K (where K≥1) (hereafter referred to collectively as "CB switches 217" and individually as "CB switch 217"), a group of circuit breaker (CB) power indicators 220-1, . . . , 220-L (where L≥1) (hereafter referred to collectively as "CB power indicators 220" and individually as "CB power indicator 220"), a group of power status indicators 222-1, . . . , 222-M (where M≥1) (hereafter referred to collectively as "power status indicators 222" and individually as "power status indicator 222"), a power supply power indicator 225, a power supply fault indicator 227, and a power supply connector 230. The number of components, illustrated in FIG. 2, is provided for explanatory purposes. In practice, there may be additional components; fewer components; different components; or differently arranged components than illustrated in FIG. 2.

Vent 205 may enable heat to be transferred from within power supply 110 to ambient air that is outside power supply 110 for the purposes of cooling components within power supply 110. Handle 210 may enable power supply 110 to be carried and/or moved for purposes of transport, installation, de-installation and/or other purposes. CBs 215 may provide damage protection measures to power supply 110. Each of CBs 215 may correspond to a respective power cable 130 installed in PAA 120. For example, CB 215 may enable a quantity of power to be transported from a particular power cable 130, within PAA 120, to power supply 110 provided that the quantity of power is below a threshold. In the event the quantity of power is greater than the threshold, CB 215 may be tripped. The tripped CB 215 may cause the connection between the particular power cable 130 and power supply 110, to be broken, which may preclude power from being transported to power supply 110.

CB switches 217 may enable CBs 215 to be turned on and/or off, and/or may provide an indication, to an operator of power supply 110, whether CBs 215 have been tripped. For example, CB switch 217 may be moved to a position (e.g., an up position as shown by CB 217-1) that causes circuit breaker 215 to which CB switch 217 corresponds (e.g., CB 215-1) to be turned on. In another example, CB switch 217 may be moved to another position (e.g., a down position as shown by CB 217-K) that causes CB 215 to which CB switch 217 corresponds (e.g., CB 215-J) to be turned off. In yet another example, CB 215-J may be tripped (e.g., when a quantity of power is greater than the threshold), which may cause CB switch 217-K to move from the position (e.g., the up position) to a further position (e.g., a middle position or the down position, etc.).

CB power indicator 220 may include one or more devices, such as a LED, a light, a speaker, a display, etc., that provides an indication, to an operator of power supply 110, regarding whether CB 215 is on (e.g., is permitting power to be transported to power supply 110). Each CB power indicator 220 may be associated with a respective CB 215. In an example implementation, a particular CB power indicator 220 (e.g., CB power indicator 220-1) may be a LED that emits light when power is being received via CB 215 to which the particular CB power indicator 220 corresponds (e.g., CB 215-1). In another example, another CB power indicator 220 (e.g., CB power indicator 220-L) may be a LED that does not emit light when power is not being received via CB 215 to which the other CB power indicator 220 corresponds (e.g., CB 2154), such as when the other CB 215 has been tripped and/or turned off.

Power status indicator 222 may include one or more devices, such as a LED, a light, a speaker, a display, etc., that provides an indication, to an operator of power supply 110, regarding whether power, to be received via a particular power cable 130, has been detected at an input terminal associated with CB 215 that corresponds to the particular power cable 130. Each power status indicator 222 may be associated with a respective CB 215. In one example, power status indicator 222 may be a LED that emits light of a particular color (e.g., green) when power is detected at the input of CB 215 to which power status indicator 222 corresponds. In another example, power status indicator 222 may be a LED that does not emit any light when power is not detected at the input of CB 215 to which power status indicator 222 corresponds. In yet another example, power status indicator 222 may be a LED that emits light of another color (e.g., red) when power, associated with a reverse polarity, is detected at the input of CB 215 to which power status indicator 222 corresponds.

Power supply power indicator 225 may include one or more devices, such as a LED, a light, a speaker, a display, etc., that provides an indication, to an operator of power supply 110, regarding whether power supply 110 is powered up. Power supply fault indicator 227 may also provide an indication, to an operator of power supply 110, regarding whether power supply 110 is functioning properly. In one example, power supply fault indicator 227 may be an LED that emits light that indicates, to an operator of power supply 110, that power supply 110 is malfunctioning (e.g., one or more CBs 215 are tripped, etc.). In another example, power supply fault indicator 227 may be an LED that does not emit any light that indicates that power supply 110 is functioning properly (e.g., when no CBs 215 are tripped, etc.).

Power supply connector 230 may be a connector via which power is transported to power supply 110. For example, connector 230 may be connected to another connector associated with PAA 120 (e.g., when PAA 120 is installed in power supply 110 via port 114 of FIG. 1A) to form a junction via which power is transported. The power may be transported from power cables 130, via the junction formed by connector 230 and the other connector, to power supply 110.

Figure 3A:
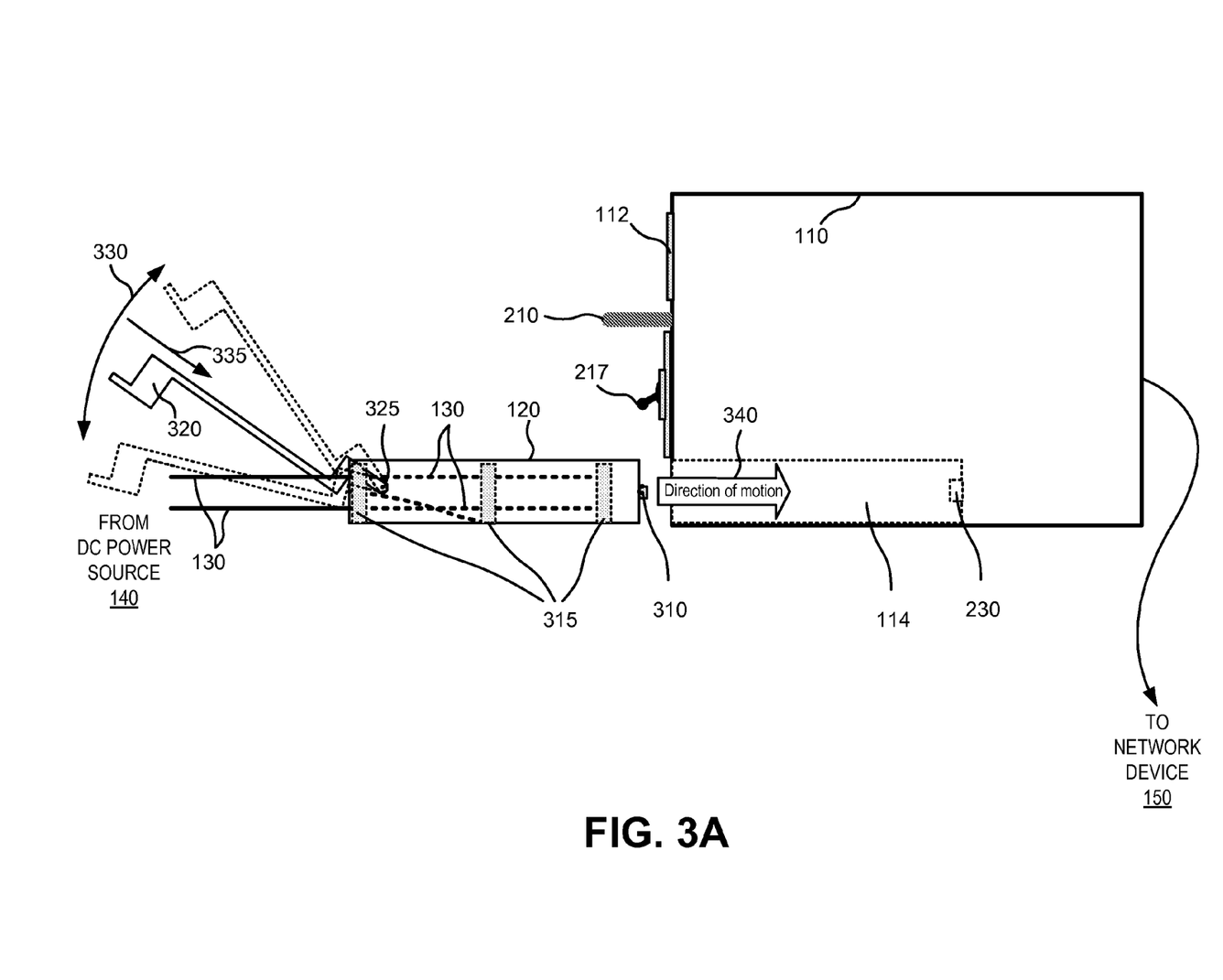
FIG. 3A is a diagram of an example power attachment assembly being installed in the power supply network of FIGS. 1A and 1B.

FIG. 3A is a diagram of an example PAA 120 being installed in power supply 110. PAA 120 may include a collection of components, such as a PAA connector 310, a power cable harness 315, a PAA handle 320, and a PAA handle hinge 325 (hereinafter referred to as a "hinge 325"). The number of components, illustrated in FIG. 3A, is provided for explanatory purposes. In practice, there may be additional components; fewer components; different components; or differently arranged components than illustrated in FIG. 3A.

PAA connector 310 may be a connector via which power is transported from PAA 120 to power supply 110. For example, PAA connector 310 may include terminals that enable each of power cables 130 to be connected to PAA connector 310. PAA connector 310 may be connected to connector 230 (FIG. 2) (e.g., when PAA 120 is installed in power supply 110 via port 114 of FIG. 1A) to form a junction via which power is transported from PAA 120 to power supply 110. The power may be transported from power cables 130, via the junction formed by PAA connector 310 and connector 230, to power supply 110.

Power cable harness 315 may hold power cables 130 in a fixed position relative to PAA 120 and/or PAA connector 310 when PAA 120 is being installed or removed from power supply 110. PAA handle 320 may be a handle that connects to PAA 120 via hinge 325 on one side of PAA 120 and another hinge 325 on another side of PAA 120 that is opposite the one side. Hinge 325 may enable PAA handle 320 to be attached to PAA 120. Hinge 325 may act as a pivot point about which PAA handle 320 may be moved in a radial direction (e.g., as shown by arrow 330) relative to PAA 120. In an example implementation, PAA handle 320 may permit an operator, of PAA 120 and/or power supply 110, to install PAA 120 in power supply 110. For example, the operator may use handle 320 to impart a force (e.g., as shown by arrow 335), via hinge 325, on PAA 120 that may cause PAA 120 to move (e.g., in the direction of motion as shown by block arrow 340) into port 114.

Figure 3B:
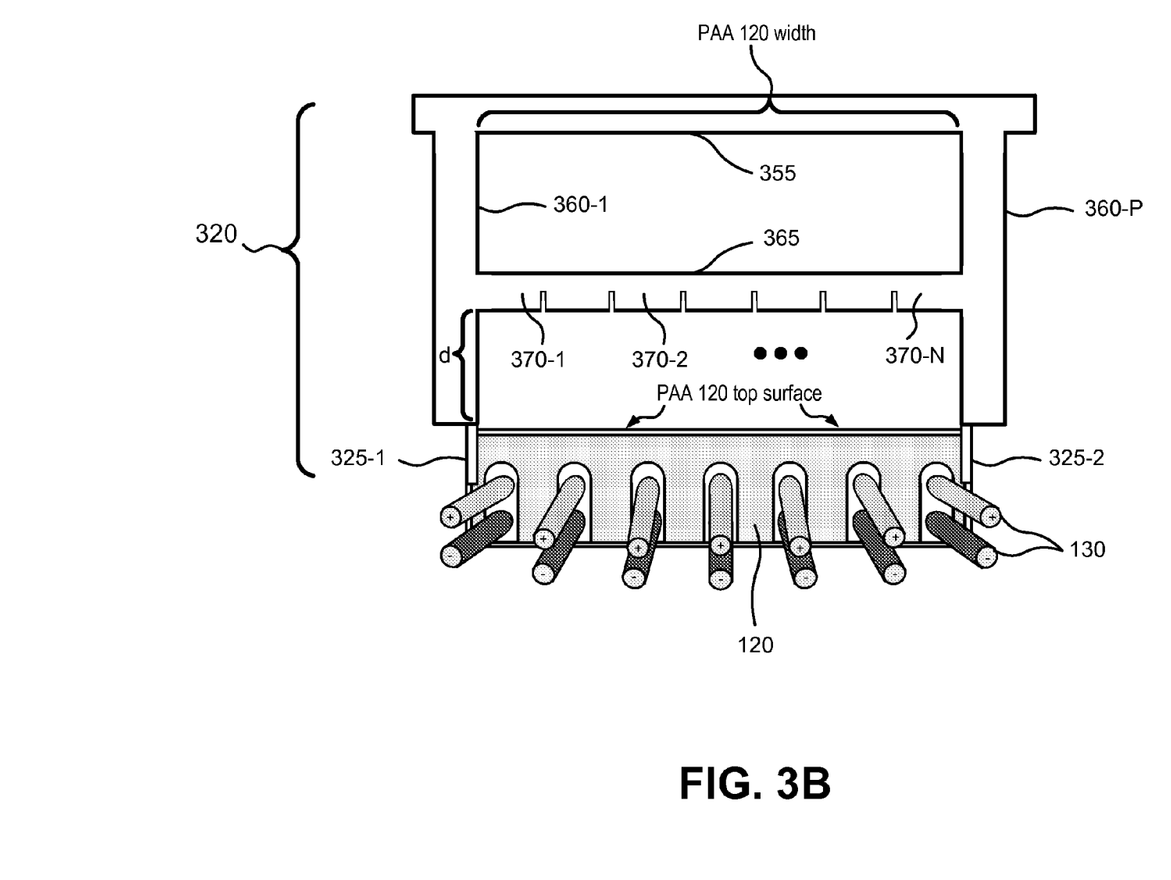
FIG. 3B is a diagram of example components of a power attachment assembly handle of FIG. 3A.

FIG. 3B is a diagram of PAA handle 320 according to an implementation described herein. PAA handle 320 may include a collection of components, such as an upper horizontal brace 355, a set of vertical braces 360-1, . . . , 360-P (where P≥1), a lower horizontal brace 365, and a group of circuit breaker (CB) toggle blades 370-1, . . . , 370-N (where N≥1). The number of components, illustrated in FIG. 3B, is provided for explanatory purposes. In practice, there may be additional components; fewer components; different components; or differently arranged components than illustrated in FIG. 3B. In one example implementation, upper horizontal brace 355, vertical braces 360, lower horizontal brace 365, and CB toggle blades 370 may be integrally formed from a variety of materials, such as metals, plastics, ceramics, and/or a combination of the aforementioned.

Upper horizontal brace 355 may include a horizontal member (e.g., an I-beam, an L-beam, an H-beam, a rod, etc.) that is attached, at or near one end, to vertical brace 360-1 and at or near another end to another vertical brace 360-2. Upper horizontal brace 355 may generally be parallel to a width dimension associated with PAA 120 (e.g., shown as PAA 120 width). Vertical braces 360 may generally be perpendicular to the width dimension associated with PAA 120 and may attach upper horizontal brace 355 to PAA 120. For example, vertical brace 360-1 may include a member that is attached, at one end, to upper horizontal brace 321 and is attached, at another end, to PAA 120 via hinge 325-1. In another example, vertical brace 360-P may include another member that is attached, at one end, to upper horizontal brace 321 and at another end to PAA 120 via hinge 325-2.

Lower horizontal brace 365 may include a horizontal member (e.g., an I-beam, an L-beam, an H-beam, a rod, etc.) that is attached, at one end, to vertical brace 360-1 and at another end to vertical brace 360-P. Lower horizontal brace 365 may generally be parallel to the width associated with PAA 120. Lower horizontal brace 365 may be attached to vertical braces 360 at a particular distance (e.g., shown as distance d) from PAA 120, when vertical braces 360 are oriented in a manner that are perpendicular to a surface associated with PAA 120 (e.g., shown as PAA 120 top surface). CB toggle blades 370 may be a part of and/or connected to lower horizontal brace 365. Each of CB toggle blades 370 may correspond to a respective CB 215 and/or CB switch 217. In an example implementation, the particular distance (e.g., distance d) may be set in a manner that enables CB toggle blade 370 to toggle CB switch 217 when PAA handle 320 is used to disconnect PAA 120 from power supply 110 (to be described in greater detail below). When toggling CB switch 217, CB toggle blade 370 may cause CB 215 to be tripped, which may preclude power from being transported from PAA 120 to power supply 110 via CB 215.

Figure 4:
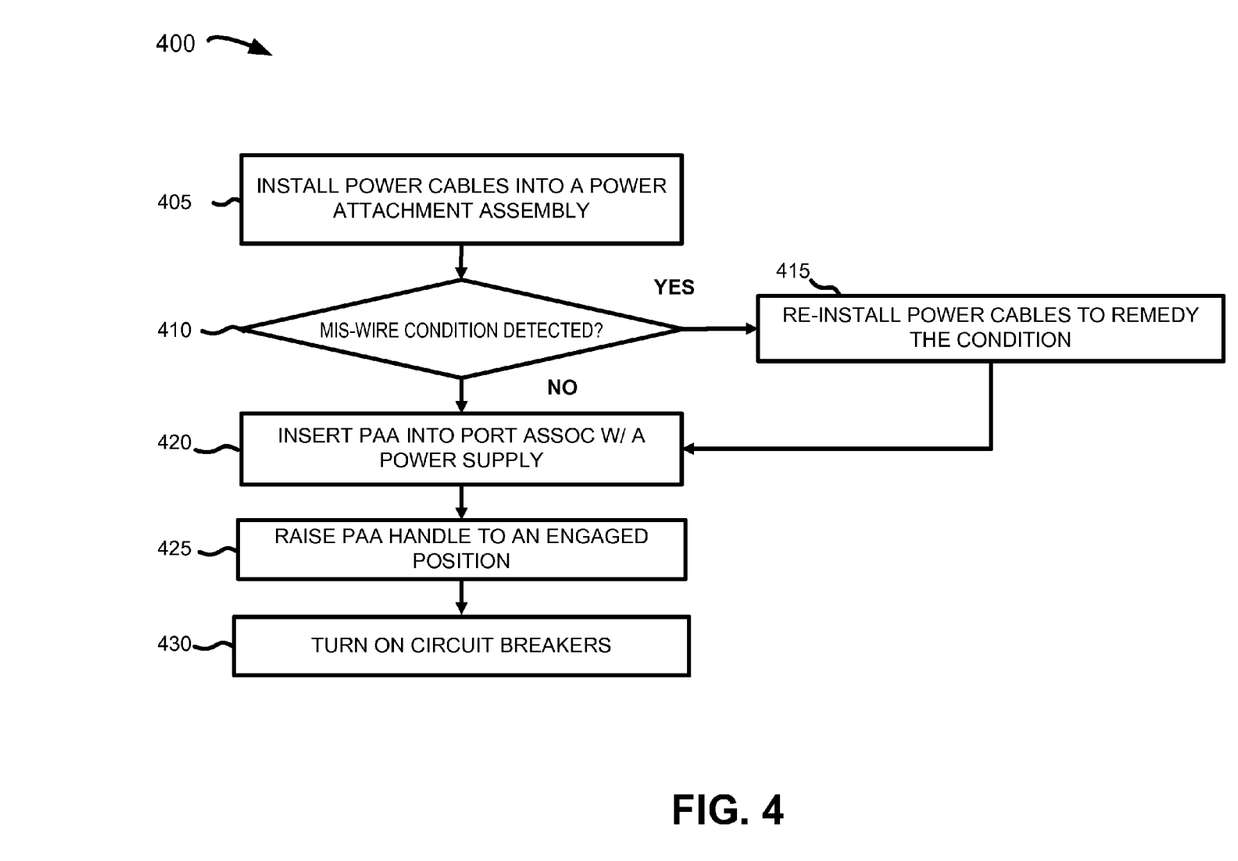
FIG. 4 is a flowchart of an example process for connecting power cables to a power supply.
Figure 5A:
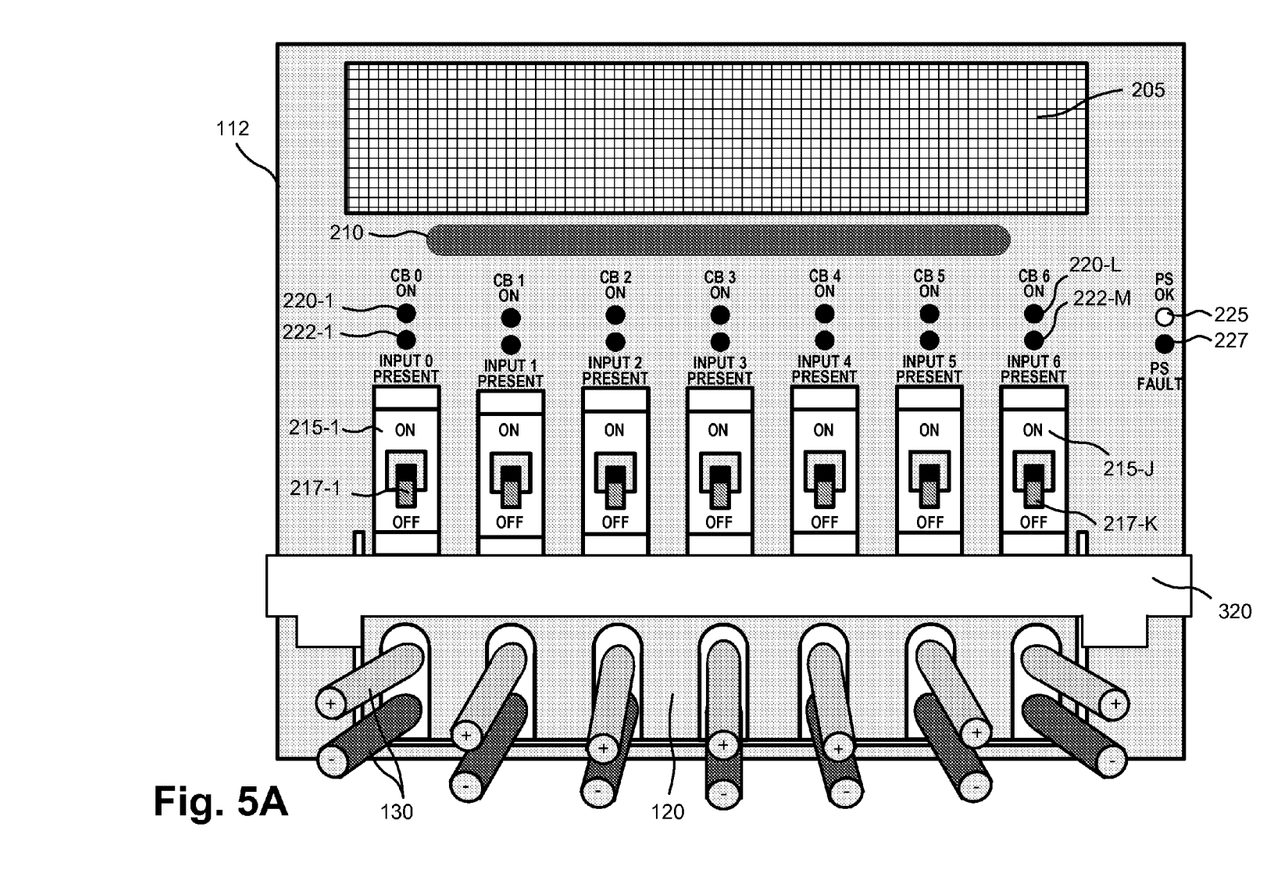
FIGS. 5A-5C is are diagrams an example power attachment assembly being installed in a power supply at different steps of the installation.
Figure 5B:
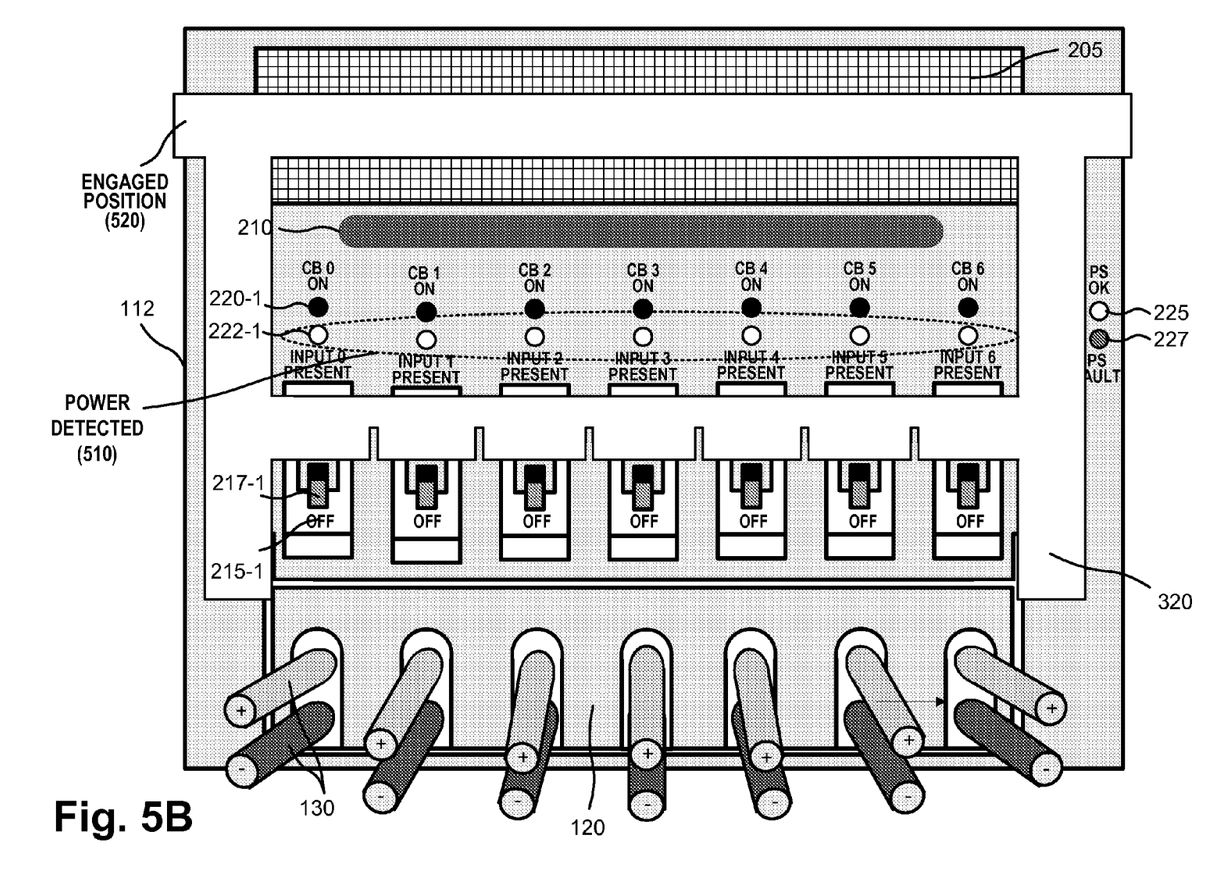
Figure 5C:
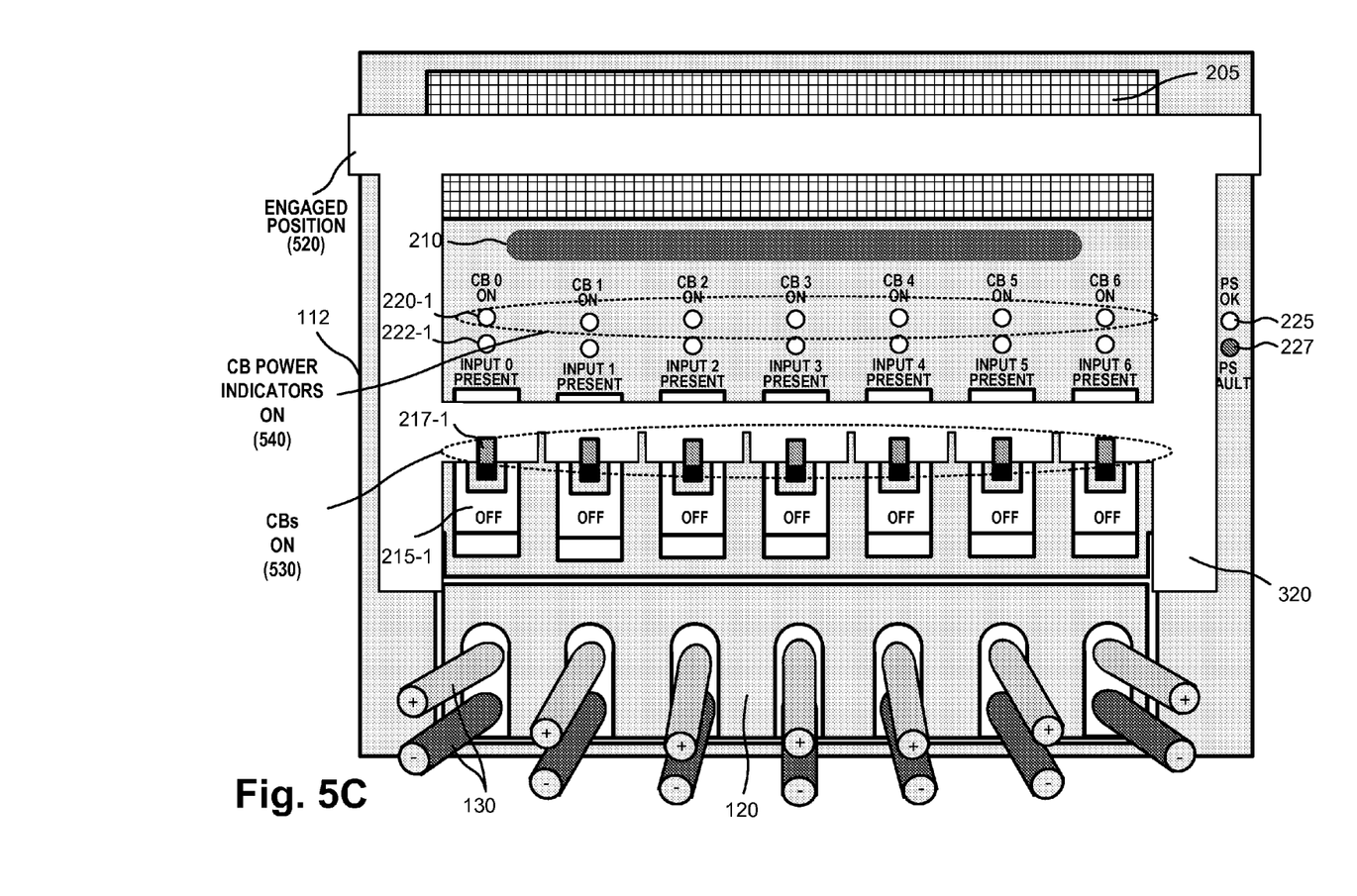

FIG. 4 is a flowchart of an example process 400 for connecting power cables 130 to power supply 110 according to an implementation described herein. In one example implementation, process 400 may be performed by PAA 120. In another example implementation, some or all of process 400 may be performed by a device or collection of devices separate from, or in combination with, PAA 120. FIGS. 5A-5C are diagrams of PAA 120 being installed in power supply 110 at different steps of the installation. Power supply 110 and/or PAA 120 may include the features described above in connection with FIGS. 1-3B. A portion of process 400 of FIG. 4 will be discussed below with corresponding references to FIGS. 5A-5C.

As shown in FIG. 4, process 400 may include installing power cables in PAA 120 (block 405). For example, an operator may install one or more pairs of power cables 130 in harnesses associated with PAA 120. Each power cable 130 may be connected to a terminal associated with a connector (e.g., connector 310 of FIG. 3A). The operator may determine whether any of power cables 130 have been mis-wired based on status indicators 122 associated with PAA 120.

As also shown in FIG. 4, if a mis-wire condition is detected (block 410—YES), process 400 may include re-installing power cables 130 to remedy the condition (block 415). For example, status indicator 122 may indicate that a mis-wire condition exists when a polarity, associated with a pair of power cables 130 (e.g., a power cable associated with a ground voltage and another power cable associated with a quantity of positive voltage or negative voltage relative to the ground voltage), has been reversed. Status indicator 122 may, in an example implementation, indicate that the mis-wire condition exists by emitting light associated with a particular color (e.g., red) from an LED associated with status indicator 122.

In another example, status indicator 122 may indicate that a mis-wire condition exists when a pair of power cables 130 is not connected to connector 310 (FIG. 3A). Status indicator 122 may, in an example, not detect power from the pair of power cables 130. In one example implementation, status indicator 122 may indicate that a mis-wire condition exists by not emitting any light from an LED associated with status indicator 122.

Based on the indication that a mis-wire condition exists, an operator, associated with PAA 120 and/or power supply 110 may re-install power cables 130 to remedy the mis-wire condition.

As further shown in FIG. 4, if a mis-wire condition is not detected (block 410—NO), process 400 may include inserting PAA 120 into a port associated with power supply 110 (block 420). For example, status indicators 122 may indicate that the installation, or reinstallation, of the power cables 130 was performed in a manner that does not include a mis-wired condition. Status indicators 122 may, in an example implementation, indicate that a mis-wire condition is not present when a light associated with a particular color (e.g., green light) is emitted from LEDs associated with status indicators 122.

Based on the determination that the mis-wire condition does not exist, the operator may perform an operation to install PAA 120 into power supply 110. For example, the operator my ensure that all CB switches 217 (FIG. 5A) are in the off position and/or that all CB power indicators 222 indicate that CBs 215 are tripped to protect power supply 110 from a surge and/or damage during the installation process. CB power indicators may indicate that CBs 215 are tripped when, in one example, no light is emitted from LEDs associated with CB power indicators 222.

The operator may insert PAA 120 into a port associated with power supply 110 (e.g., port 114 of FIG. 1A). In one example, as shown in FIG. 5A, the operator my cause PAA 120 to slide into the port until a connector associated with PAA 120 (e.g., connector 310 of FIG. 3A) is connected to another connector associated with power supply 110 (e.g., connector 230 of FIG. 2). In another example, the operator may use PAA handle 320 to insert PAA 120 into power supply 120 and/or slide PAA 120 into the port until the connector is connected to the other connector. In yet another example, as shown in FIG. 5B, the operator may cause PAA 120 to slide into the port until power status indicators 222 indicate that power, from power cables 130, is detected at the input terminal of each CB 215. In one example, power status indicators 222 may indicate that the power has been detected when LEDs, associated with power status indicators 222 emit light (e.g., as shown by an ellipse annotated as power detected 510).

As yet further shown in FIG. 4, process 400 may include raising a PAA handle to an engaged position (block 425) and turning on circuit breakers associated with the power supply 110 (block 430). For example, the operator may verify that PAA 120 has been installed in the power supply (e.g., based on the power status indicators 222). Based on the verification that PAA 120 has been installed in power supply 110 and that power is detected, the operator may, as shown in FIG. 5B, move PAA handle 320 to a vertical position and/or to a position that causes PAA handle 320 to make contact with power supply control panel 112 (e.g., shown as by engaged position 520).

The operator may, as shown in FIG. 5C, turn on CBs 215 by moving CB switches 217 from one position to another position, such as an on position (e.g., as shown by an ellipse annotated as CBs one 530). CB power indicators 220 may indicate that power is being transported from PAA 120 to power supply 110 via each of CBs 215. In an example implementation, CB power indicators 220 may indicate that power is being transported, via CBs 215, by emitting light from LEDs associated with CB power indicators 220 (e.g., as shown by an ellipse annotated as CB power indicators on 540). In another example implementation, PAA 120 may be installed in a manner that does not include PAA handle 320.

Figure 6:
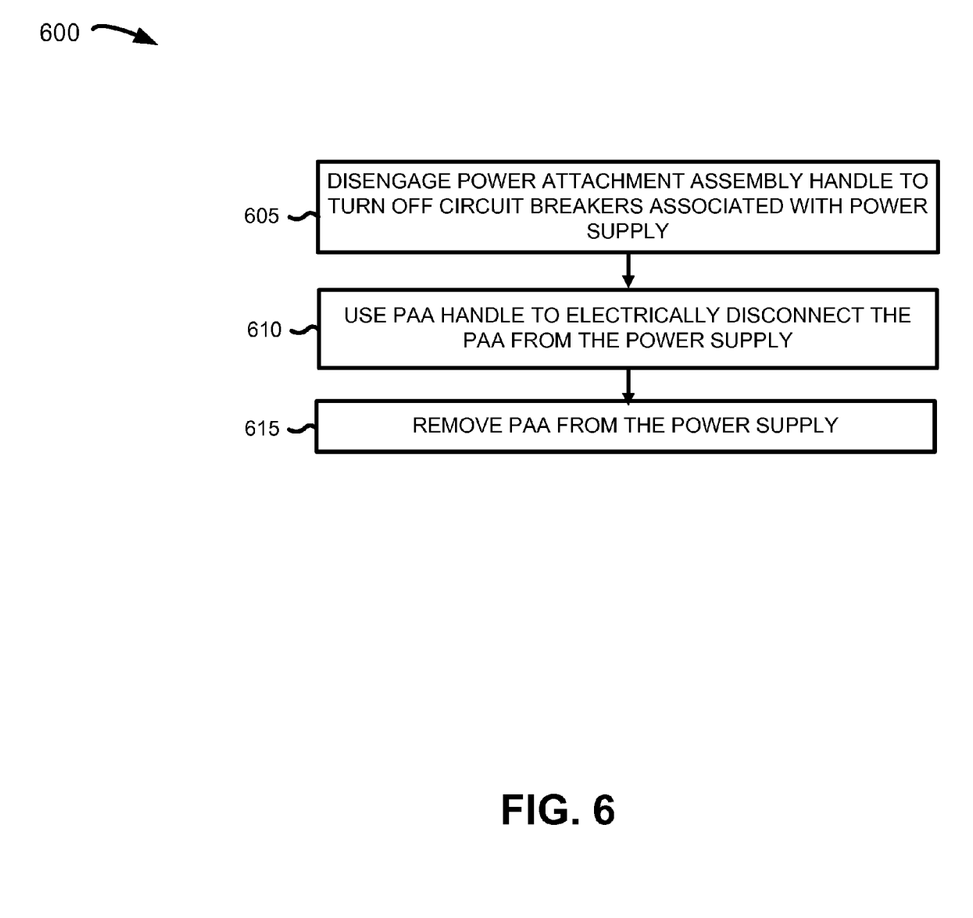
FIG. 6 is a flowchart of an example process for decoupling a power attachment assembly from a power supply.
Figure 7:
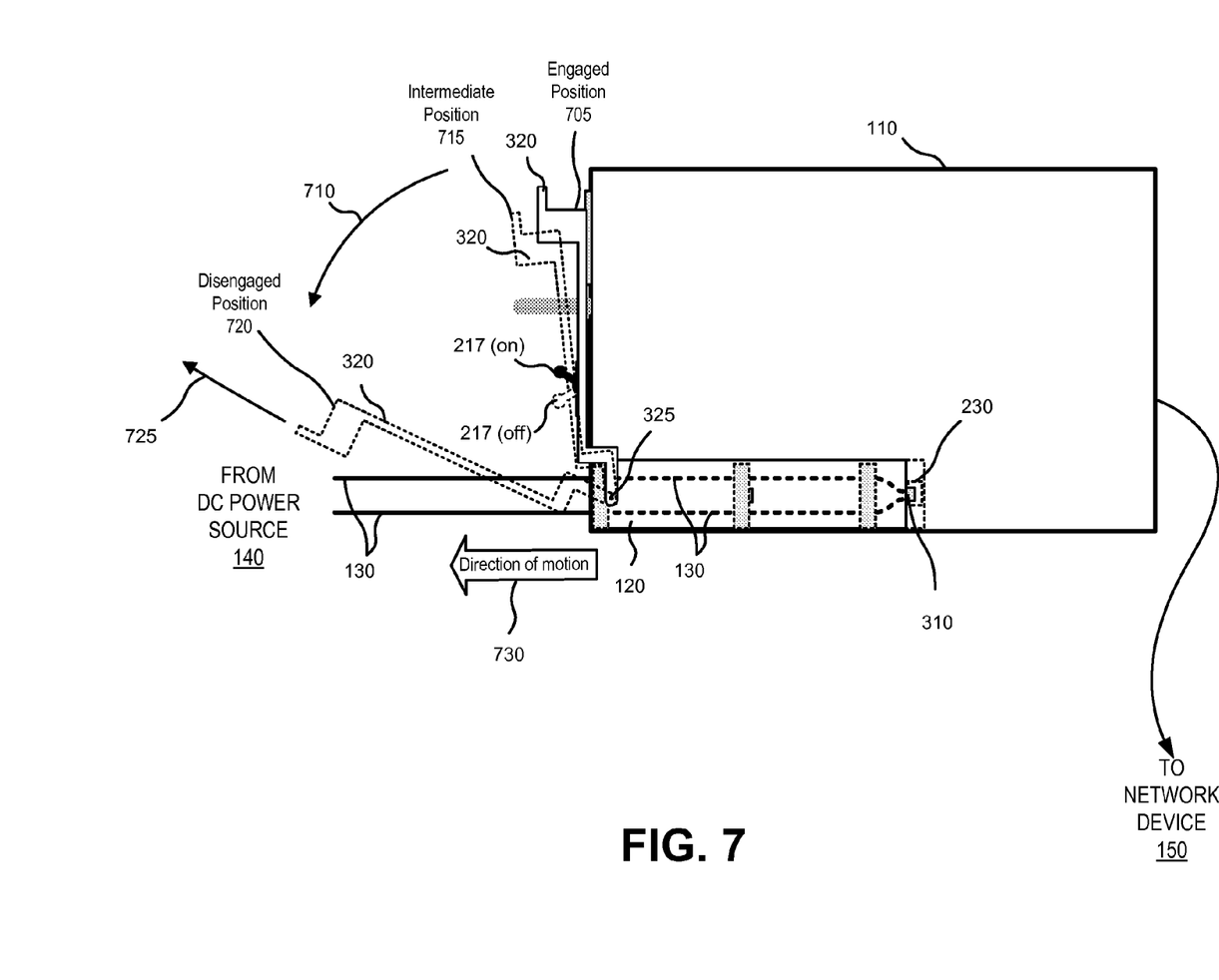
FIG. 7 is a diagram of an example power attachment assembly being disconnected from a power supply.

FIG. 6 is a flowchart of an example process 600 for disconnecting power cables 130 from power supply 110 according to an implementation described herein. In one example implementation, process 600 may be performed by PAA 120. In another example implementation, some or all of process 600 may be performed by a device or collection of devices separate from, or in combination with, PAA 120. FIG. 7 is a diagram of an example PAA 120 being disconnected from power supply 110. Power supply 110 and/or PAA 120 may include the features described above in connection with FIGS. 1-3B. A portion of process 600 of FIG. 6 will be discussed below with corresponding references to FIG. 7.

As shown in FIG. 6, process 600 may include disengaging PAA handle 320 to turn off CBs 215 associated with power supply 110 (block 605). For example, an operator of PAA 120 and/or power supply 110 may desire to disconnect power cables 130 from power supply 110. The operator may move PAA handle 320 in manner that causes CBs 215 to be turned off (e.g., by causing CB switches 217 to move to an off position). For example, as shown in FIG. 7, an operator may cause PAA handle 320 to move from engaged position 705, in the direction of arrow 710, to an intermediate position 715. Moving PAA handle 320 in the direction of arrow 710 may cause CB switches 217 to be moved to the off position. CB switches 217 may, for example, be moved to the off position by CB toggle blades 370 (FIG. 3B) when PAA handle 320 is moved in the direction of arrow 710. Moving CB switches 217 to the off position may cause CBs 215 to be turned off, which may break a connection via which power is transmitted from power cables 130 to power supply 110.

As also shown by FIG. 6, process 600 may include initiating removal of PAA 120 from power supply 110 to electrically disconnect PAA 120 (block 610). For example, the operator may move PAA handle 320 to a position that permits the operator to begin to remove PAA 120 from power supply 110 and/or electrically disconnect PAA 120. For example, as shown in FIG. 7, the operator may move PAA handle 320 from intermediate position 715, in the direction of arrow 710, to disengaged position 720. The operator may use PAA handle 320 to pull in the direction of arrow 725 to begin to move PAA 120 out of port 114 of power supply 110 (e.g., in the direction of motion as shown by block arrow 730). Moving PAA 120 in the direction of motion 730 may cause PAA connector 310 and connector 230 of power supply 110 to be disconnected, which may cause PAA 120 to be electrically disconnected to power supply 110.

As further shown by FIG. 6, process 600 may include removing PAA 120 from power supply 110 to mechanically disconnect PAA 120 (block 615). For example, the operator may cause PAA 120 to move out of port 114 until PAA 120 is removed from power supply 110. For example, as shown in FIG. 7, the operator may continue to pull on PAA handle 320 in the direction of arrow 725 which may cause PAA 120 to move in the direction of motion (e.g., block arrow 730) until PAA 120 is mechanically disconnected from power supply 110. The operator may use PAA handle 320 to disconnect power cables 130 from power supply 110 without shutting off power (e.g., from DC power source 140) and/or without using tools to disconnect power cables 130.

Systems and/or methods, described herein may enable power cables carrying power from a power source to be connected to and/or disconnected from a power supply, associated with a network device without temporarily shutting off the power source. The systems and/or methods may enable the power cables to be connected to and/or disconnected from the power supply without using tools to individually connect and/or disconnect the power cables. The systems and/or methods may reduce a quantity of mis-wiring incidences and/or a likelihood of damage to the power supply caused by mis-wiring incidences. The systems and/or methods may reduce a period of time associated with connecting or disconnecting power cables from the power supply. The systems and/or methods may enable power cables to be connected to and/or disconnected from the power supply in a manner that reduces a likelihood of injury to an operator associated with using tools to individually connect or disconnect the power cables from the power supply.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 4 and 6, the order of the blocks may be modified in other embodiments. Further, non-dependent blocks may be performed in parallel.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A power cable connection system comprising:
    a power attachment assembly (PAA) to house a plurality of power cables that transport electrical power from a power source, where the plurality of power cables are terminated by a connector associated with the PAA;
    a power supply to provide the electrical power to a network device, where the power supply includes another connector and a plurality of circuit breakers that corresponds to the plurality of power cables, where
        the PAA and the power supply permit the plurality of power cables to be connected to the power supply without using tools or turning off the electrical power,
        the PAA and the power supply permit the connector and the other connector to be connected to form a junction via which the electrical power is transported to the power supply, and
        the plurality of circuit breakers, when turned on, permit the electrical power to flow from the junction to the network device via the plurality of circuit breakers; and
    a handle, attached to the PAA via a hinge, to disconnect the PAA from the power supply, where the hinge permits the handle to be moved in a manner that:
        simultaneously turns off the plurality of circuit breakers prior to disconnecting the PAA from the power supply, and
        enables the PAA to be disconnected without using tools or turning off the electrical power.

2. The power cable connection system of claim 1, where the PAA further includes a plurality of power status indicators that indicate whether the plurality of power cables is carrying the electrical power.

3. The power cable connection system of claim 1, where the PAA further includes a plurality of power status indicators that indicate whether any of the plurality of power cables has been mis-wired.

4. The power cable connection system of claim 3, where the plurality of power cables includes one or more pairs of power cables, where each of the one or more pairs of power cables has a polarity based on a respective ground cable and a respective other cable associated with a quantity of positive or negative voltage relative to a ground voltage, and where the plurality of power status indicators indicate whether any of the one or more pairs of power cables has been wired in a manner that reverses the polarity.

5. The power cable connection system of claim 1, where the power supply further includes a port in which the other connector is located, and where the port is sized in a manner that:
permits the PAA to be installed within the port, and
enables the connector and the other connector to be connected when the PAA is installed in the port.

6. The power cable connection system of claim 1, where the PAA and the power supply permit the plurality of cables to be connected to the power supply simultaneously.

7. The power cable connection system of claim 1, where the handle further includes a cross member, and where the cross member is positioned on the handle in a manner that turns off a plurality of switches, associated with the plurality of circuit breakers, when the handle is moved in the manner that simultaneously turns off the plurality of circuit breakers.

8. The power cable connection system of claim 1, where the hinge permits the handle to be moved to an engaged position when the PAA and the power supply are being connected, and where the engaged position:

enables a plurality of switches, associated with the plurality of circuit breakers, to be turned on by an operator, and
enables the handle to turn off the plurality of switches when the handle is moved in the manner that simultaneously turns off the plurality of circuit breakers.

9. The power cable connection system of claim 1, where the handle permits the PAA to be removed from a port, associated with the power supply, capable of receiving the PAA.

10. An electrical power junction comprising:
a power attachment assembly (PAA) that includes:
a harness to attach a plurality of power cables that carry electrical power from a power source,
a connector to terminate the plurality of power cables, and
a movable handle to disconnect the PAA; and
a power supply, connected to a network device, that includes a port that permits the PAA to be installed in the power supply and a plurality of circuit breakers that corresponds to the plurality of power cables, where:
the PAA and the power supply permit the plurality of power cables to be connected to the power supply when the PAA is installed in the power supply,
the PAA and the power supply permit the connector and another connector, associated with the port, to form a connection via which the electrical power is transported, when the PAA is installed in the port,
the plurality of circuit breakers control whether the electrical power is transported to the power supply, via the connection, when the PAA is installed in the port,
the movable handle turns off the plurality of circuit breakers when moved to a particular position, and
the movable handle permits the PAA to be uninstalled from the port without shutting off the electrical power or using tools to disconnect the plurality of power cables from the power supply.

11. The electrical power junction of claim 10, where the PAA further comprises:
a plurality of status indicators that corresponds to the plurality of power cables, where the plurality of status indicators identifies whether the plurality of power cables is carrying the electrical power or whether any of the plurality of power cables has been mis-wired.

12. The electrical power junction of claim 10, where the power source stores or generates direct current (DC) power and where the electrical power is the DC power.

13. The electrical power junction of claim 10, where the movable handle includes:
a first member to enable movement of the movable handle,
a second member with a first end and a second end, where the first end is attached to the hinge and the second end is attached to the first member,
a third member that is attached to the second member at an attachment point, where the attachment point enables the third member to shut off the plurality of circuit breakers when the movable handle is moved to the particular position, and
the hinge, where the hinge attaches the second member to the PAA, and where the hinge enables the movable handle to move relative to the PAA or the power supply.

14. The electrical power junction of claim 10,
where the movable handle permits an operator to move the movable handle to an engaged position after the PAA is installed in the port, and
where the engaged position enables the movable handle to turn off the plurality of circuit breakers when the movable handle is moved from the engaged position to the particular position.

15. The electrical power junction of claim 10, where the movable handle enables the PAA to be provided within the port and to establish the connection between the connector and the other connector, when the PAA is being installed in the port.

16. A power supply assembly, comprising:
a power cable chassis to hold a plurality of power cables that carry electrical power from a power source, where the power cable chassis includes:
a harness via which the plurality of power cables are held,
a connector that terminates each of the plurality of power cables, and
a handle on which a force can be applied to install or uninstall the power cable chassis; and
a power supply chassis via which the electrical power is sent to a network device, where the power supply chassis includes:
a port to receive the power cable chassis,
another connector that interconnects to the connector when the power cable chassis is installed in the power supply chassis, and
a plurality of circuit breakers that:
permit the electrical power to flow to the network device when the power cable chassis is installed in the power supply chassis and at least one of the plurality of circuit breakers is turned on, and
preclude the electrical power from flowing to the network device when the power cable chassis is installed in the power supply chassis and the handle is moved to a de-install position that turns off a plurality of switches associated with the plurality of circuit breakers.

17. The power supply assembly of claim 16, where the power supply chassis further includes:
a plurality of status indicators that correspond to the plurality of circuit breakers, and where the plurality of status indicators identify whether the electrical power is being received, via the interconnection of the connector and the other connector.

18. The power supply assembly of claim 16, where the power supply chassis further includes:
   a plurality of status indicators that correspond to the plurality of circuit breakers, and
where the plurality of status indicators identifies whether the circuit breakers are permitting the electrical power to flow to the network device.

19. The power supply assembly of claim 16, where the handle permits an operator to move the handle to an install position when the PAA is installed in the port, and
   where the install position orients the handle in proximity to the plurality of circuit breakers, in a manner that causes the plurality of circuit breakers to be substantially simultaneously turned off when the handle is moved to the uninstall position.

20. The power supply assembly of claim 19, where moving the handle from the install position to the uninstall position:
   causes a plurality of switches, that correspond to the plurality of circuit breakers, to be substantially simultaneously toggled off, and
   enables an operator to apply a force to the handle that permits the power cable chassis to be uninstalled from the power supply chassis.

21. The power supply assembly of claim 16, where the handle enables an operator to apply a force to the handle that causes the power cable chassis to be inserted into the port or the other connector to be interconnected to the connector.

* * * * *